United States Patent
Hyndman et al.

(10) Patent No.: US 8,385,527 B2
(45) Date of Patent: Feb. 26, 2013

(54) METHOD AND APPARATUS FOR OVERLAYING WHISPERED AUDIO ONTO A TELEPHONE CALL

(75) Inventors: Arn Hyndman, Ottawa (CA); Nicholas Sauriol, Kanata (CA)

(73) Assignee: Rockstar Consortium US LP, New York, NY (US)

( * ) Notice: Subject to any disclaimer, the term of this patent is extended or adjusted under 35 U.S.C. 154(b) by 1418 days.

(21) Appl. No.: 11/986,005

(22) Filed: Nov. 19, 2007

(65) Prior Publication Data

US 2009/0129565 A1    May 21, 2009

(51) Int. Cl.
*H04M 3/42* (2006.01)

(52) U.S. Cl. ............... 379/202.01; 379/93.21; 379/158; 370/260; 455/416

(58) Field of Classification Search ............ 379/202.01, 379/93.21, 157, 158, 201.01, 207.01; 370/259, 370/260; 455/414.1, 461
See application file for complete search history.

(56) References Cited

U.S. PATENT DOCUMENTS

| | | | |
|---|---|---|---|
| 5,455,859 A | 10/1995 | Gutzmer | |
| 6,339,639 B1 | 1/2002 | Henderson | |
| 2002/0044199 A1 | 4/2002 | Barzebar et al. | |
| 2003/0112947 A1* | 6/2003 | Cohen ..................... | 379/202.01 |
| 2003/0158900 A1* | 8/2003 | Santos ..................... | 709/205 |
| 2004/0047461 A1* | 3/2004 | Weisman et al. ........ | 379/202.01 |
| 2004/0136545 A1* | 7/2004 | Sarpeshkar et al. ..... | 381/98 |
| 2006/0133261 A1* | 6/2006 | Cosovic et al. .......... | 370/208 |
| 2008/0254753 A1* | 10/2008 | Steenstra et al. ........ | 455/90.1 |

* cited by examiner

*Primary Examiner* — Ahmad Matar
*Assistant Examiner* — Khai N Nguyen
(74) *Attorney, Agent, or Firm* — Anderson Gorecki & Rouille

(57) ABSTRACT

Information may be provided to a telephony customer from an overlay service by causing a second stream of audio information to be overlayed on a primary stream of audio information. The overlayed information may be whispered to the user by causing the overlayed information to be compressed into a limited frequency spectrum which is inserted into a manufactured gap in the primary audio stream. This allows the user to continue to hear the main audio stream while also hearing the overlayed information. The overlay service may provide administrative information, advertisements, music, and/or Internet search results via the overlayed audio. Users may issue commands to the overlay service, to have particular information transmitted via overlayed audio. Where the user is also associated with a telephony application running on a computer platform, the overlayed information may be incorporated onto the information being shown to the user on a computer display.

15 Claims, 5 Drawing Sheets

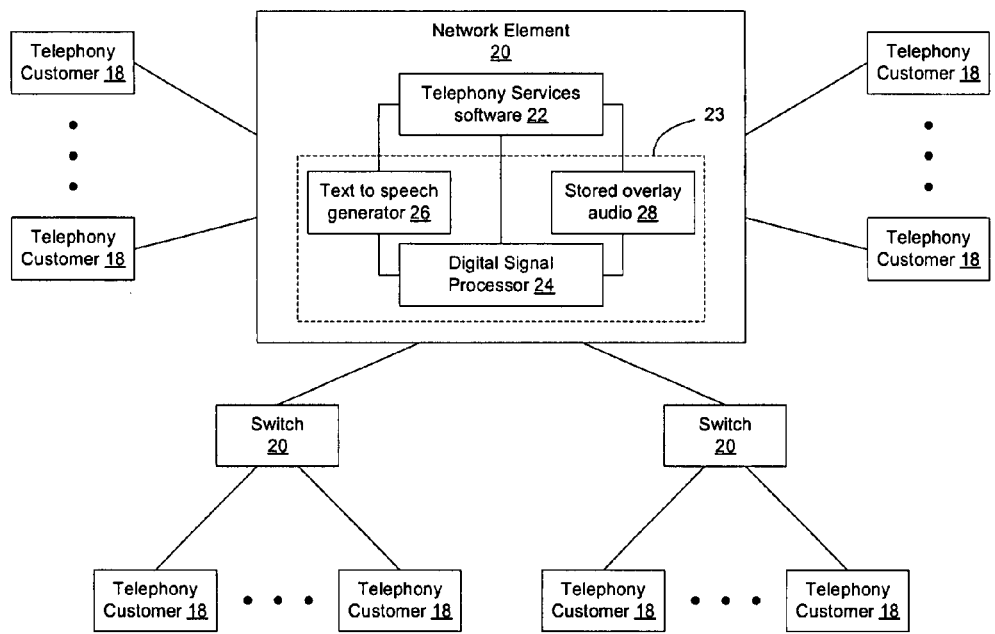
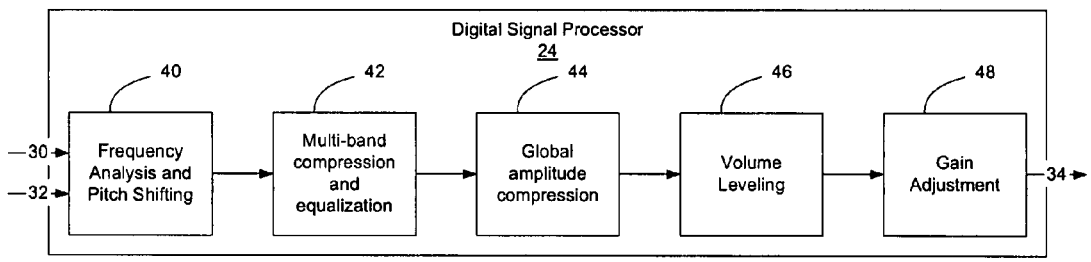

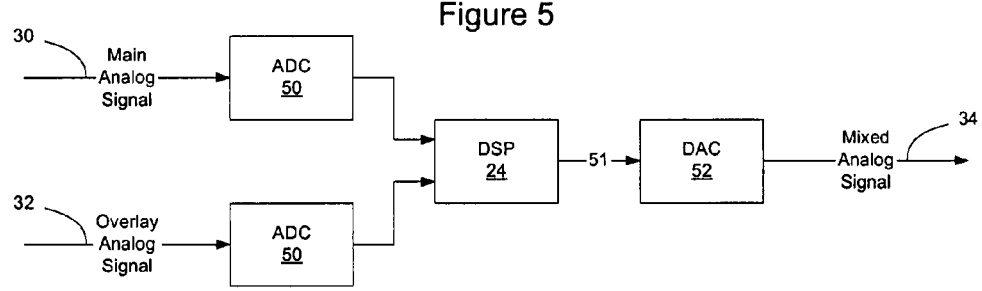
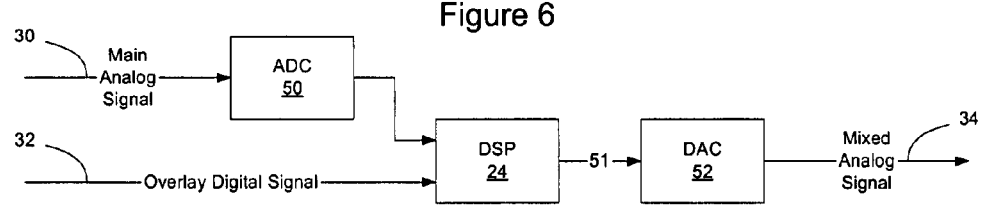
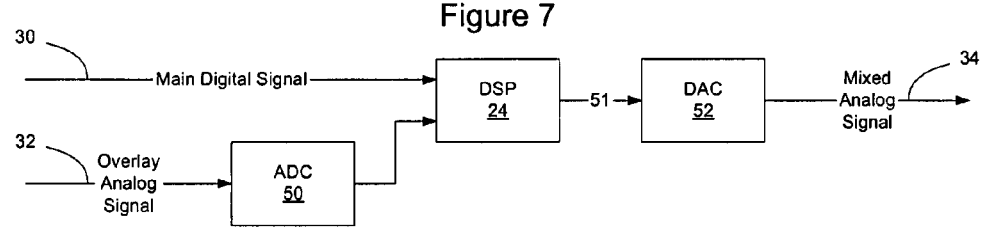
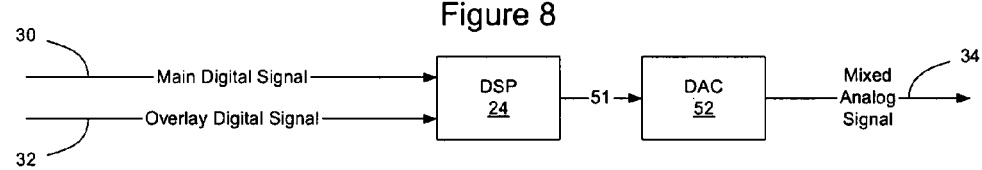
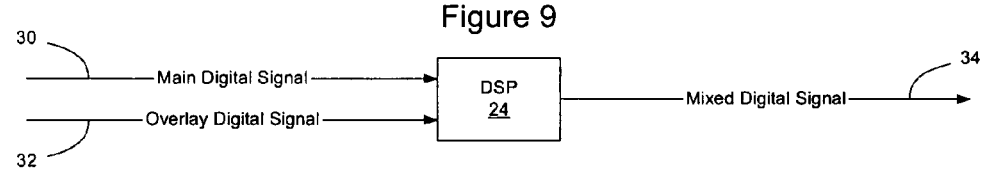

METHOD AND APPARATUS FOR OVERLAYING WHISPERED AUDIO ONTO A TELEPHONE CALL

BACKGROUND OF THE INVENTION

1. Field of the Invention

The present invention relates to communication networks and, more particularly, to a method and apparatus for overlaying whispered audio onto a telephone call.

2. Description of the Related Art

Telephone networks have been in use for many years and have evolved considerably over time. The Public Switched Telephone Network (PSTN) is a circuit network that allows telephone calls to be placed between two or more parties. Voice traffic may also be carried on a packet network such as the Internet using a networking protocol commonly referred to as Voice over IP (VoIP). In addition, cellular and other wireless networks have been developed and deployed to allow users to place and receive telephone calls wirelessly. All of these networks, and other private telephone networks, are interconnected to allow individuals on different types of networks to make and receive telephone calls.

As telephone services are developed, they are deployed on the network so that the new services may be sold to telephone customers. For example, telephone conferencing has been developed which allows two or more parties to be interconnected by a bridge. The bridge senses which person is talking and causes that audio stream to be sent to the other participants to the conference call. The bridge may also interject audible information by interrupting the speaker. For example, the bridge may interject that the conference call will end in five minutes, or provide other administrative information. Similarly, the bridge may interrupt the speaker by sending a beep when someone leaves or joins the call. Additionally, on a large conference call with many participants or with unfamiliar participants, it may be difficult for people participating on the call to determine who is speaking.

Other telephone services such as call waiting also generate a beep or other audible signal that temporarily interrupts the person who is speaking, so that the listeners may be provided with a signal associated with the service. In the example of call waiting, the telephone switch may temporarily stop transmitting the voice signal from the other person on the call and generate a Beep that is interpreted by the person receiving the second call as a signal that another call is on the other line. Since the beep is transmitted instead of the normal voice signal, the person receiving the second call may lose half a second or more of the audio and may need to have the person repeat what was being said at that point in the conversation.

SUMMARY OF THE INVENTION

Information may be provided to a user of an ordinary telephone handset by causing a second stream of audio information to be overlayed on the primary stream of audio information. The overlayed information may be whispered to the user by causing the overlayed information to be compressed into a limited frequency spectrum. This allows the user to continue to hear the main audio stream while also hearing the overlayed information. Optionally a temporary gap may be created in the main audio stream by reducing the amplitude of the main audio stream in the limited frequency spectrum, so that the overlayed information may be discernable from the regular audio stream. The overlayed information may be used to transmit administrative information, commands, search results, advertisements, music, or other content. In one embodiment, in a conference call context, the overlayed information may be used to transmit information related to the identity of the person who is currently speaking. Optionally, where the system is integrated with a computer-based display, the identity of the speaker may also be displayed on a Graphical User Interface of a computer program associated with the conference call.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 3 is a functional block diagram of a network element interconnecting telephony customers;

FIG. 4 is a functional block diagram of digital signal processing operation that may be used to implement an embodiment of the invention;

FIGS. 5-9 are functional block diagrams showing how whispered audio may be overlayed on a main audio signal according to several embodiments of the invention;

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
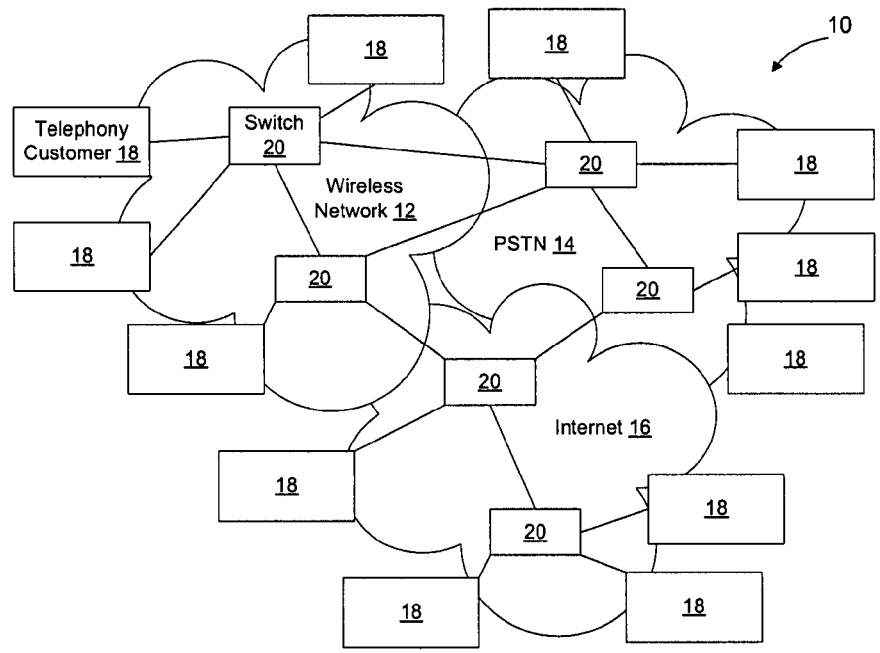
FIG. 1 is a functional block diagram of a reference communication network.

FIG. 1 shows an example network 10, including a wireless network 12, the Public Switched Telephone Network (PSTN) 14, and the Internet 16. The portions of the network have been shown as separated for convenience—in reality the three networks often are coextensive geographically, such that a given telephony customer 18 may be able to connect to all three networks at the same time using the same or different pieces of user equipment. For example, a telephony customer may connect to the Internet via a computer with Internet access, may talk on a telephone that is connected to the PSTN, and may also have a cellular telephone with access to a wireless network. Additionally, the customer may use a telephony program running on a computer and talk with people connected to the network. The invention is not limited by the particular network selected to implement a portion of the invention, as the invention may be implemented in any of these network areas.

Telephony customers 18 connect to the network of their choice. For example a wireless customer may make a wireless telephone call on the wireless network or may access the internet through their wireless telephone or laptop computer. Similarly, a different telephony customer may place a telephone call on the PSTN or may access the Internet using a computer through the PSTN via a dial-up connection, a DSL connection, or other connection. Other customers may place a telephone call on the Internet, by accessing the internet via satellite, cable modem, or another manner. There are multiple ways in which telephony customers may place telephone calls and the invention is not intended to be limited to the particular way in which the telephony customer accesses the network.

Within the networks, various network elements 20 are used to allow data to be passed between telephony customers. There are many known network architectures that may be used to implement the underlying networks, and the invention is not limited to any particular architecture. FIG. 1 has shown several network elements 20 in each network interconnected with each other and interconnecting the various aspects of the network 10. The network elements may be implemented in a manner particular to the network on which they reside. Thus, for example, a "network element" in the wireless network may be different than a "network element" on the Internet or a "network element" on the PSTN. Since the particular network element chosen to implement the connection is irrelevant to the invention, these various devices have been collectively referred to as "network elements". Thus, the term "network element" as used herein is to be considered a generic term for a device that sits on a network and is capable of performing telephony services on behalf of telephony users. According to an embodiment of the invention, one or more of the network elements or a computer/server associated with one or more of the network elements or one or more of the networks, may be configured to overlay whispered audio onto a main audio stream to thereby allow more than one stream of audio to be simultaneously output to a given telephony customer.

Figure 2:
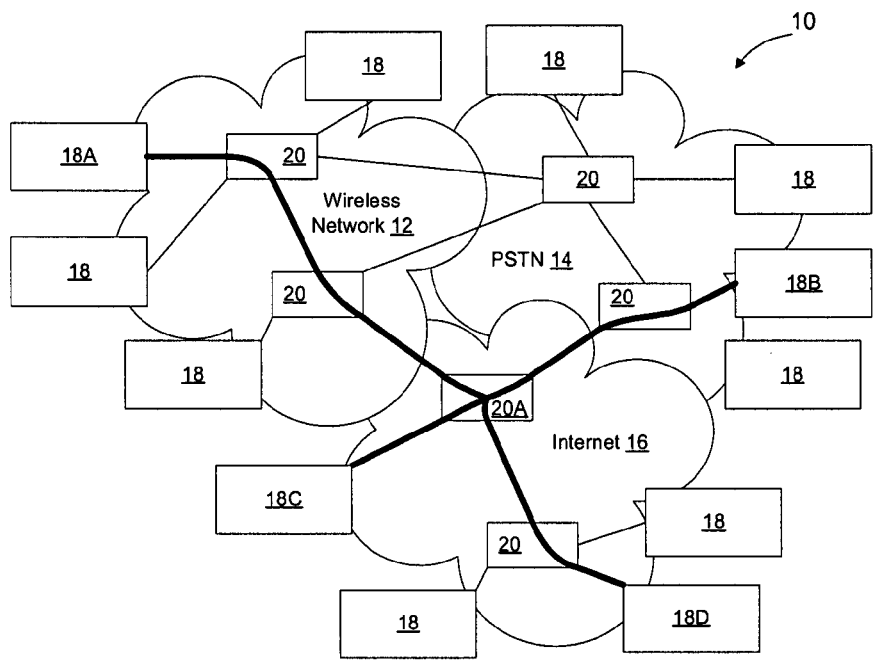
FIG. 2 shows an example conference call interconnected through the reference communication network of FIG. 1.

FIG. 2 illustrates an example conference call established between telephony customer 18A on wireless network 12, telephony customer 18B on the PSTN, and telephony customers 18C and 18D connecting on a VoIP connection established through the Internet. The conference call may be hosted by network element 20A such as a bridge, or may be otherwise implemented depending on the particular way in which the networks are configured to establish calls on the network. The invention is not limited to the particular manner in which the call is established or how it is implemented on the underlying network elements. For example, the conference call may be hosted by a telephony application resident on one or more of the network elements 20 of FIG. 1. In the illustrated embodiment the network element hosting the telephone conference has been shown as resident on the Internet. The invention is not limited in this manner as the network element hosting the telephone conference could equally have been implemented on the PSTN or the wireless network.

FIG. 3 illustrates a network element 20 interconnecting telephony customers 18. In the embodiment shown in FIG. 3, the network element 20 includes telephony services software 22 designed to provide telephony services to the customers 18. There are many different services provided on telephone networks such as call waiting, caller ID, three way calling, conference calling, and numerous other services. These services and other telephony services are often implemented as software applications such as telephony services application 22 hosted by a network element 20. In operation a telephony customer will interact with the telephony services software 22 by pressing buttons on their telephone (Dual Tone Multi-Frequency) or by issuing speech commands to the telephony services software. Although an embodiment has been shown in which the telephony services are hosted by the network element, the telephony services may also be hosted by a server or other device associated with one or more of the network elements 20. The overlay service described herein may be implemented by the telephony services software 22 or may be implemented as a separate overlay service 23 as shown in FIG. 3.

According to an embodiment of the invention, an overlay service is provided to overlay one or more secondary audio streams onto a primary audio stream, so that more than one audio stream may be transmitted to a given telephony customer at the same time over a particular telephone call. By overlaying information onto the primary audio stream, information other than the normal audio stream may be conveyed to the telephony customer. Since the information is overlayed or whispered, the telephony customer does not need to have specialized equipment to receive the additional information, since the telephony customer's handset will be able to output the mixed audio stream in the same manner as it would output any stream of audio information.

According to an embodiment of the invention, the overlay signal is processed to be heard as a whisper over the main audio signal. In this way additional information may be transmitted to the listener while continuing to allow the main audio signal to also be transmitted to the listener. This may be useful in many contexts. For example, if a person is on the phone and receives a second call, rather than having the call notification occur as a beep that interrupts the main audio stream, a whispered notification may be provided. The whispered notification may be generic such as "new call on line two" or may be specific and provide caller ID information such as "John Jones is calling on line two." By whispering the information to the listener the listener may obtain information about the event that is occurring, and is better informed as to whether they would like to interrupt the main call to take the call that is incoming on the other line. Since the information is overlayed, however, the main audio stream is not interrupted so that the person does not lose a part of the main audio context.

Whispering may also be useful in other contexts, and the list is not limited to an implementation that is used in connection with a call waiting service. For example, in a conference call situation, the names of persons entering and leaving the call may be whispered to the conference call chairperson so that the chairperson knows who is on the call at all times. Additionally, other administrative information may be provided by the bridge hosting the call, such as the number of participants, the duration remaining, and other administrative information that is commonly provided during a call to the participants or the chairperson. For example, the name of the person speaking may be whispered to the chairperson or to the other participants on the conference call. As another example, if a person missed a portion of what was said, the person may press a series of keys on their keypad to cause the portion to be replayed (whispered) so that they can re-hear the last few seconds of the conversation.

As yet another example, where a person making a call has placed the call using a calling card, the telephone system may whisper to the person when the call is about to end because the amount of money stored on the calling card is almost used up. Other similar features about the call may be provided to the person placing a call by the telephone system as well.

The audio to be overlayed onto the main audio stream may come from multiple sources. For example, in the embodiment shown in FIG. 3, the telephony software may generate the audio to be overlayed on the main audio stream by retrieving text and sending the text to the text to speech generator 26, or by causing stored audio 28 to be overlayed onto the main audio stream. For example, when a person joins a conference call, the name of the person joining the call may be sent to a text to speech generator 26 to cause the person's name to be whispered to the host of the conference call or to all the other participants to the conference call. Where one or more participants have a computer telephony program running on their computer, the person's name or other information may be simultaneously added to a Graphical User Interface (GUI) shown on a computer screen as well, and added to the conference control program or other telephony application running on one or more of the telephony customer's computers.

Alternatively, the person may be prompted to say their name when joining the conference call and the stored name may be whispered to the host or to all participants. Optionally a combination of these methods may be used, for example a partial stored message may be mixed with the result of a text to speech message and overlayed onto the main audio stream. Other sources of overlay audio will be described in greater detail below in connection with FIG. 11.

FIG. 4 is a functional block diagram of a digital signal processor 24 which shows one way in which an embodiment of the invention may be implemented. As shown in FIG. 4, the digital signal processor is used to take two streams of data, a main audio signal 30 and an overlay signal 32, and combine the two signals to form a mixed output signal 34. The input signals and output signals may be any combination of analog and digital signals as shown in connection with FIGS. 5-9 and as discussed in greater detail below.

In the embodiment shown in FIG. 4, the digital signal processor contains control logic that will allow the two signals to be mixed such that each audio signal is discernable to the end listener as a separate signal. In one embodiment, the overlay signal is processed to simulate a whispered overlay audio signal, which simulates a person's whispered voice. One way to do this is to create a frequency gap in the main audio stream, process the signal to be overlayed to primarily occupy frequencies within the frequency gap, and fit the overlay signal within that frequency gap in the main audio signal.

In the embodiment shown in FIG. 4, the digital signal processor has a frequency analysis and pitch shifting module 40. The frequency analysis portion of the module 40 determines which frequencies are in use in the main audio signal, and the pitch shifting module increases or decreases the frequencies of particular syllables or phonemes to reduce the amplitude of the signals present in a particular frequency band. Thus, the frequency analysis and pitch shifting module allows a frequency band (referred to herein as a gap band) to be cleared to be used by the overlay audio stream.

The main audio stream is likely to need to be processed in real time to create a gap whenever an overlay audio signal is to be included in the output signal 34. However, where there is no overlay signal to be transmitted, the digital signal processor may simply pass the main audio stream without requiring the processing. When the overlay audio signal is not null, the main audio signal may be processed in real-time to create the gap for the overlay signal.

In some instances, different audio signals will need to be transmitted to different participants to a telephone call. For example, a bridged conference call may cause the leader of the call to receive a different audio stream than is presented to all the other participants to the conference call. Since the audio stream to be presented to different telephony customers may be different, the overlay service may implement this feature such that different audio overlay is able to be combined onto the different main audio streams. Thus, different overlay audio may be provided to each person on a conference call. Similarly, when a person receives a second call, the overlay audio that tells the person that there is another call coming in may be audible only to the person receiving the second call. Alternatively, the same overlay may be presented to all parties on a call if that is found to be a desirable feature and an embodiment of the invention may easily be implemented in this manner.

The overlay audio signal may be pre-processed to fit into the gap band created in the main audio signal. For example, announcements that are relevant for use on multiple phone calls may be pre-processed and stored by the overlay service as stored audio overlay 28. Alternatively, the overlay audio signal may be also processed in real time to fit into the gap band created in the main audio signal. For example, where the overlay audio signal is not pre-compressed to fit within the band gap, the overlay audio signal may be frequency shifted in a manner similar to that described above in connection with the main audio signal, except that in this instance the overlay audio signal is processed to fit within the band gap rather than being processed to create the band gap. Thus, the same processes may be utilized to compress the overlay signal to fit within the band gap as are used to compress the main overlay signal to fit outside of the band gap.

The digital signal processor also includes a multi-band compression and equalization module 42 configured to reduce the amplitude of signals outside of the frequency range designated for the overlay. When the signals are frequency shifted out of the gap band this may create high amplitude signals outside of the gap band. The multi-band compression and equalization module rectifies this by reducing the amplitude of these signals to start to equalize the amplitude of the signals outside the gap band.

The digital signal processor also includes a global amplitude compression module designed to reduce the differences between loud and quiet sounds while the overlay audio stream is present. This module helps to reduce fluctuations in the main audio stream so that the whispered overlay audio is consistently hearable by the listener.

The digital signal processor 24 includes a volume leveling module 46 configured to adjust the volume of the two audio streams so that both are decipherable to the listener. If the overlay is too loud, the main audio stream may not be discernable. Similarly, if the main audio stream is too loud, the listener may not be able to hear the information being conveyed via the overlay audio stream. In one embodiment the two streams are adjusted to be of approximately the same volume, although in other embodiments the volume difference between the two streams may be adjusted in a different manner. For example the whispered overlay may have a decibel level significantly lower or higher to place the overlay in the background or foreground relative to the main audio signal. Optionally this may be a user-adjustable option such that the person listening to the composite overlay/main mixed audio signal may adjust the volume level of the overlay relative to the main signal, or adjust the volume level of the main signal relative to the overlay. User adjustment may be implemented using one or more keys on a telephone keypad or via a GUI on a computer-based telephony program running on a personal computer or hand-held computing device. Optionally, the user may be allowed to adjust the volume level to the point where the overlay is no longer discernable to thereby allow the user to turn the overlay signal off relative to the main signal.

The digital signal processor 24 also includes, in the embodiment shown in FIG. 4, an overall gain adjustment module 48 configured to adjust the overall volume level of the mixed output signal 34. It may be desirable for the overall volume level of the signal being transmitted to the listener to be approximately the same level when an overlay audio signal is included in the mixed output signal 34 as when no overlay audio signal is not included in the output signal 34. The gain adjustment mechanism may sense the amplitude of the input main audio signal 30 and adjust the output signal 34 to have approximately the same amplitude as the input main audio signal 30. By maintaining the output signal 34 approximately the same as the input main audio signal 30, a person listening to the output signal 34 will not perceive a sudden increase/decrease in volume as the overlay signal starts to be added or ceases to be added to the main audio signal. This module thus is provided so that the volume of the output signal 34 presented to the listener, does not increase or decrease dramatically when information is transmitted to the listener via the overlay signal. Although one example set of functional modules has been shown as implemented in the digital signal processor, the invention is not limited to this particular example. Thus, combinations of these functional modules may used or other functional modules may be used and the invention is not limited to this particular embodiment.

FIGS. 5-9 illustrate several embodiments of how the network element may mix the main audio signal 30 with the overlay signal 32 depending on the format of the particular signals. For example, in FIG. 5 both the main signal 30 and the overlay signal 32 are analog signals. Accordingly, the analog signals are sent through an Analog to Digital Converter (ADC) 50 which transforms the analog signals to digital signals. Although two ADCs 50 are shown in FIG. 5, the same ADC may be used to convert both the main analog signal 30 and the overlay analog signal 32 into digital form.

The digital signals are then passed to the digital signal processor 24 where they are combined. The output signal 34 in the embodiment shown in FIG. 5 is an analog signal, since the local loop in the PSTN has conventionally been implemented to transmit analog signals. Thus, where the output signal is to be an analog signal, the output from the digital signal processor 24 is passed through a Digital to Analog Converter (DAC) 52 which transforms the digital signal 51 into an analog signal for transmission to the listener.

FIG. 6 shows an embodiment of the invention in which the overlay signal is a digital signal. For example, the overlay signal may be saved as stored overlay audio files 28 which may be stored in digital form. The digital overlay signal may be input directly to the DSP 24 and need not be transformed via the ADC 50. The rest of the processing circuitry in FIG. 6 is the same as shown in FIG. 5.

FIG. 7 shows an embodiment in which the main signal 30 is a digital signal, which may occur for example where the telephone call is implemented using digital rather than analog signals. FIGS. 8 and 9 show embodiments where both the main signal 30 and the overlay signal 32 are both digital. The main difference in these two embodiments is that in FIG. 8 the output signal is analog, whereas in FIG. 9 the output signal is digital. All of the embodiments shown in FIGS. 5-8 may be implemented to incorporate a digital output signal by simply omitting the Digital to Analog Converter (DAC) 52.

One application of the overlay system described herein is in connection with providing the telephone service provider with an opportunity to overlay advertising onto personal telephone calls. For example, a telephone provider may provide a person with an opportunity to obtain free or reduced fee telephone service if the person agrees to have advertising overlayed onto their telephone calls. The advertising may be periodic or continuous, may be local to the region based on the location of the calling party, may be regional/national advertising, and may be selected based on the context of the conversation taking place on the telephone call. Many different advertising systems have been developed in connection with Internet and radio advertising which may be adapted for use in connection with overlay advertising. In one embodiment, where the overlay system described herein is used for advertising, the volume of the overlay is reduced relative to the main audio stream so that the advertising is in the background of the telephone call. In this manner the advertising will still be present on the call but form more of a background soundtrack for the telephone call rather than an interruption to the main conversation taking place on the call. The overlay advertising may be audible to both parties/all parties to the call, or may be specifically directed only to one of the parties to the call.

In another embodiment, music may be selected to be played in the background of the telephone call. For example, when making a call, the caller may select one or more songs, genre, or other musical selection to be played in the background on the call. The selected music may be overlayed onto the main audio stream to one, two, or all of the participants to the call. The selected music may be paid for separately by one or more of the parties, and optionally may be selectable during the call by the parties. For example, the music may be selected from a juke box type application associated with the overlay service so that one or more of the telephony customers may select to have one or more songs played during the telephone call. Other ways of selecting music may be utilized as well and the invention is not limited to how the musical selection is determined.

Although the previous description has focused on the transmission of whispered audio in the direction of one of the telephony customers, the invention is not limited in this manner as whispering may occur in both directions. For example, the listener may whisper back on a separate channel to one or more of the other participants to the call, to the bridge hosting the conference call, to the chairperson of a conference call, or to another subset of participants. This may be implemented, for example, by pressing a series of keys (e.g. *6) and then speaking into their handset. This may be useful, for example while on a conference call, to allow a person to submit a request for additional information. Depending on the particular implementation, the listener may specify how the whisper back should be transmitted. For example, the listener may specify that the reply whisper should be transmitted to all participants on the call, to the chairperson of a conference call, to a specific other participant, or in some other manner. The request may be received by the telephony network element, converted to text in a speech to text generator, and submitted to Google or another Internet search engine. The results may then be passed to the person making the request by whispering the results over the main audio stream.

Figure 10:
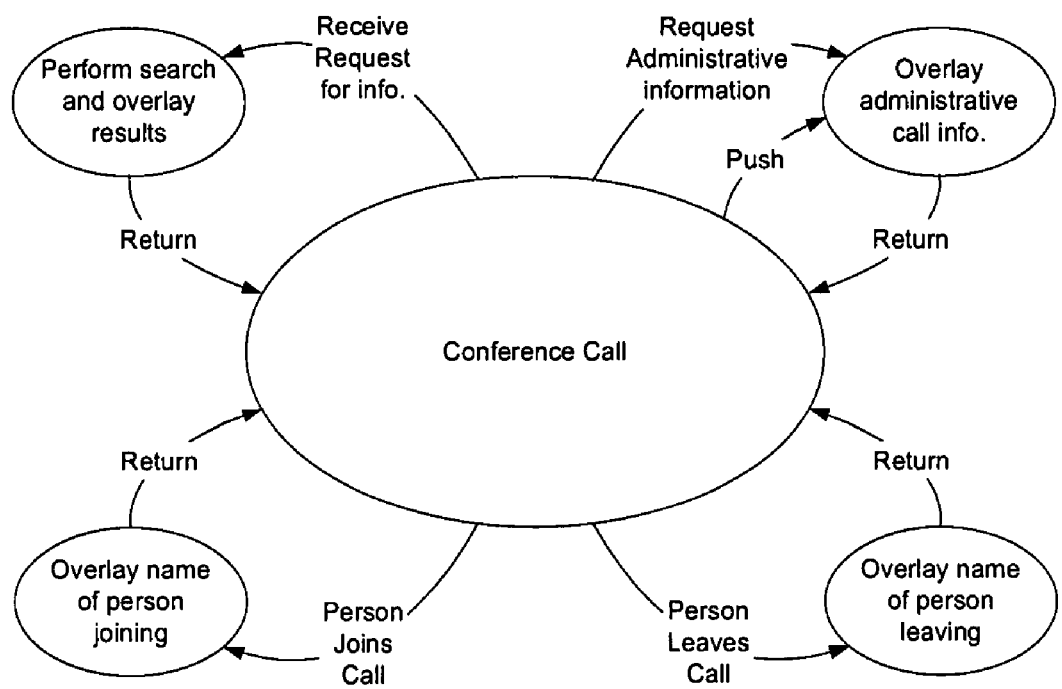
FIG. 10 illustrates example flow logic that may be utilized to overlay information onto an audio stream by telephony services software according to an embodiment of the invention.

FIG. 10 illustrates a flow diagram of several functions that may be implemented utilizing an overlay service, such as the overlay service described in greater detail above. Other functions may be implemented as well. In the example shown in FIG. 10, it will be assumed that a conference call 200 has been established between a plurality of telephony customers. Typically, one of the telephony customers will be the host and the remaining telephony customers will be participants.

When a person joins the call 202, the overlay service may overlay the name of the person joining the call to the telephone conference host 204. The service will then stop overlaying audio and return 206. Optionally, the host may be allowed to instruct the bridge hosting the telephone call that the person that just joined the call is not allowed to participate on the call to have the bridge evict the person from the telephone call. Denial of access of this nature may be whispered by the host to the bridge.

If a person leaves the call 208, the overlay service may overlay the name of the person leaving the conference call to the host 210. Once the information has been overlayed on the main audio stream, the process will return 212.

The host or another authorized participant may request administrative information associated with the call 214, such as the duration of the call, number of participants, etc. Alternatively, one or more participants may request to know the name of the person speaking 214. Additionally, administrative information may automatically be pushed 216 to one or more of the participants. For example, the name of the person speaking may automatically be transmitted via an overlay audio when a new person starts speaking. The administrative information may be overlayed onto the call 218 to cause the requested or determined administrative information to be presented to the host and/or to one or more of the other participants to the conference call. Once the overlayed information has been transmitted, the process will return 220. Administrative information may also be displayed on a computer GUI, for example by making an icon appear next to the name of a person participating in the call when that person is speaking. The system may use voice recognition to determine who is speaking and/or the line/port over which the audio is received at the bridge.

In one embodiment of the invention, the host or one of the other participants to the conference call may request additional information by speaking a request for additional information via an overlay channel. The request may be directed to the network element hosting the conference call or to another network element associated with that network element. When a request for additional information is received, the overlay service will perform a search and overlay the results to the requestor and/or to any other desired or designated participants 224. The process will then return. The search may be, for example, an Internet search so that other information about the topic being discussed may be obtained in real time while continuing to participate in the conference call.

Figure 11:
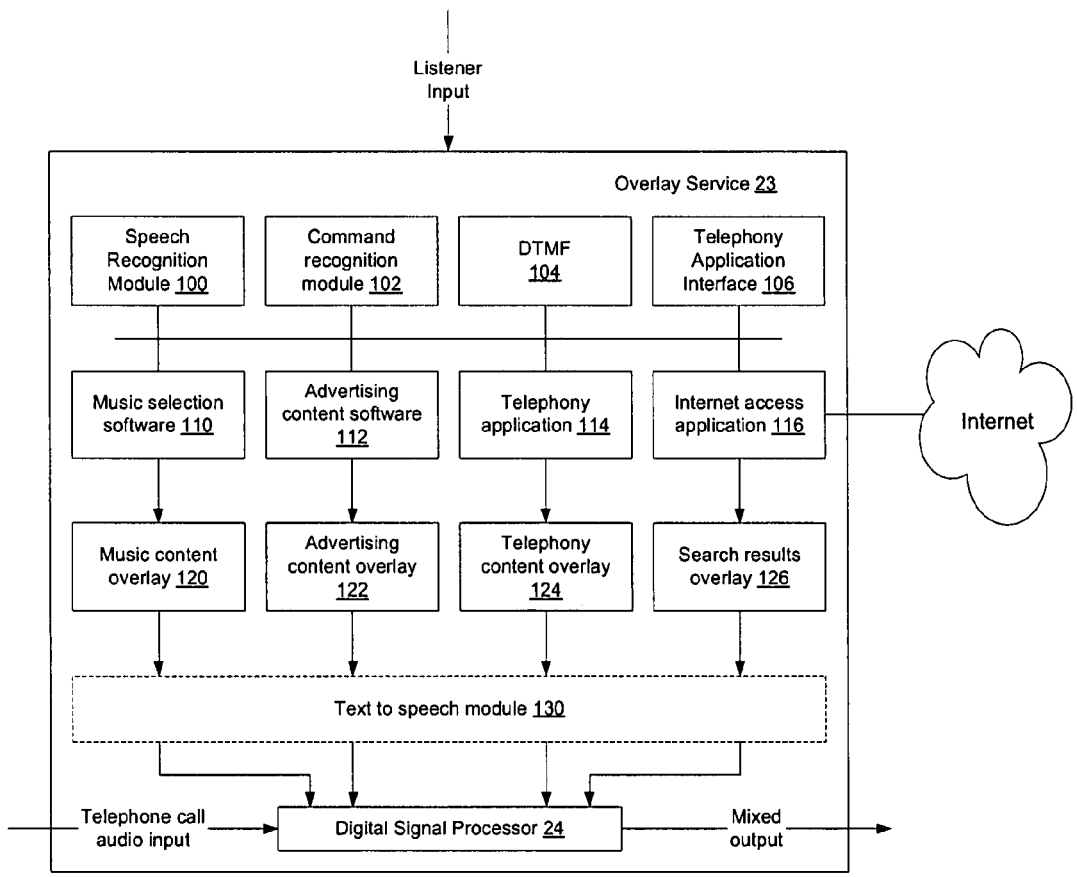
FIG. 11 is a functional block diagram of an overlay service that may provide one or more types of overlayed audio according to an embodiment of the invention.

FIG. 11 shows an example of an overlay service that is configured to allow music, advertising, administrative telephony information, and search results, to be overlayed onto a stream of telephony data. In the embodiment shown in FIG. 11, the overlay service 23 includes speech recognition software 100 and command recognition software 102. The combination of the speech recognition and command recognition software allows the overlay service to receive commands from the listener. For example, the overlay service may require each person to give a speech sample when starting a conference call, and the speech recognition module may ten perform speech recognition to determine who is speaking on the call. The identity of the person speaking may then be whispered to the other users automatically or on demand, or may be provided to a computer based telephony program by causing an icon to appear next to the name of the participant to identify that person as the current speaker.

Optionally, a Dual Tone Multi-Frequency (DTMF) module 104 may be provided as well to allow the overlay service to receive commands from users pressing buttons on their telephone handsets. In the embodiment shown in FIG. 11, the overlay service also includes a telephony application interface 106 to allow the overlay service 23 to receive inputs from users that happen to be running a telephony application on their computer/handheld computing device. The overlay service thus has one or more input modules 100, 102, 104, and 106 configured to receive commands from the telephony customers. Depending on the particular implementation, a given overlay service may have a subset of these input modules and may even have additional input modules.

The overlay service shown in FIG. 11 also has content modules configured to generate or obtain content to be overlayed on an input audio stream, optionally upon request from one or more of the telephony customers as received by the overlay service via one or more of the input modules. For example, the overlay service may have a music selection module 110 configured to obtain requests for songs and obtain music content 120 to be overlayed onto a telephone call. The music selection module 110 may have a selection of songs locally cached or may obtain the music content from the Internet 108.

The overlay service may also have an advertising selection module 112 configured to obtain advertisements 122 to be overlayed onto the telephone call. The advertising module may receive as input speech recognized by the speech recognition software 100 and look for key words that may be used to select more relevant advertising to be played during the telephone call. For example, where the telephone call is taking place at 5:00 in the evening and the participants mention the word "dinner," an advertisement for a local pizza restaurant may be played as an overlay. The advertising content, like the music content, may be stored locally or obtained from the Internet. Many different ways of doing targeted advertising have been developed for use in connection with Internet searches, and it is likely that one or more of these could be adapted to be used in connection with selection of content to be played as an overlay signal on telephone calls. Optionally, where users opt to receive advertisements as part of an overlay signal, the price of telephone service charged by the telephone service provider may be reduced so that the users may obtain free or reduced-rate telephone service by agreeing to have advertisements overlayed onto their telephone calls.

In the embodiment shown in FIG. 23, the overlay service also has a telephony application 114, such as a conference call application, that is able to generate or obtain administrative information 124 to be overlayed onto the telephone call. The overlay information may be, for example, the identity of a person speaking on the call, the location of a participant, the time zone/actual time of the person participating in the call, or other information that may be of interest to people participating on a conference call or to the host of the conference call. Optionally, the telephony application interface 106 may also cause the same information or a subset of the administrative information to appear on a GUI of those telephony customers that are also able to view information about the telephone call via an instance of a telephony application instantiated on their local computer. For example, an icon may be caused to appear next to the name of a person speaking on the telephone call. Thus, while the information may be whispered on the main audio stream, some or all of the information may also be presented to those users that are using a computer-based telephony application so that the GUI of the computer-based telephony application may be caused to display the same information or a subset of the information that is being whispered via the overlay service 23.

Similarly, the overlay service may have an Internet access application 116 configured to receive search requests via the command recognition software 102, formulate searches to be passed to the Internet 108, and receive results returned from the Internet. The Internet access application may parse the results to generate search results 126 to be overlayed onto the telephone call. The Internet access application 116 may also handle Internet access request from the music selection module 110 and advertising selection module 112 and return the results to those other applications.

Titles of songs and other information associated with songs to be played on the telephone call 120, advertising content 122, telephony content 124, and search results 126, may occasionally be in text format, depending on the particular way in which the source content has been stored. Accordingly, the overlay service 23 may include a text to speech module 130 configured to generate overlay audio from text-based source materials.

The manner in which the overlay service may be controlled by a chairperson of a telephone call or another person making a call. The person controlling the overlay service for a particular telephone call, for a series of telephone calls, or in general, may specify many options about how the overlay service operates. For example, the person in control of the overlay service may specify whether music should be overlayed, whether participants are allowed to have a side meeting between themselves by whispering to each other, whether anyone other than the chairperson is allowed to whisper to each other, and many other features. The person in control of the overlay service may be a person on the call such as the chairperson of a conference call, and may establish the parameters for the whispering service before-hand or during the conference call.

The chairperson and the participants may be allowed to control the volume of the whisper. Optionally, the chairperson and participants may control different aspects of the whisper depending on the content of the whisper. For example, where the whisper is used to convey music, a person may wish to have the whisper relatively low and in the background so as to not significantly disturb the main audio stream. Where the whisper is Internet search results, the person may wish to have the whisper comparatively louder so that the person is able to understand the content of the whisper. Where the whisper is advertising, the system may prevent users from adjusting the volume of the whisper so that the person paying to have advertising overlayed onto the telephone signal may be assured that those persons on the call heard the advertisement at a particular volume. Optionally, the telephone service provider may offer "volume pricing" where an advertiser would be allowed to pay more for a louder volume overlay signal than they would for a lower volume overlay, or would be allowed to pay more for a controlled volume overlay signal in which the participants are not allowed to reduce the volume of the advertising overlay.

Another application of the overlay may be in connection with using the overlay channel to describe a visual prompt to visually impaired listeners. For example, where the video display shows a whiteboard, the overlay channel may be used to audibly describe the white board to visually impaired listeners. Similarly, the overlay channel may be used in other contexts where it would be advantageous to convey additional information such as in connection with providing translation services to persons who speak different languages. As another example, the overlay channel may also be used in a learning environment, such as long distance learning, to allow students to ask questions about the main topic and receive answers whispered on the overlay channel without interrupting the main lecture. Where the question is of general interest, of course, the lecturer may address the question on the main channel. However, where the question is of only particularized interest, the answer may be provided only to the person asking the question on the overlay channel. Alternatively, the overlay channel may be used by students to whisper between each other so that an alternative dialog may be accomplished between the students while the main lecture is carried on the main audio signal.

As yet another application, the overlay channel may be used to convey instructions as to how to use other features of the telephone service. For example, many telephone service providers offer bundles of services including caller ID, three way calling, call forwarding, voice-mail, and many other services. Although users pay for these services, many of the services may be used only infrequently and hence the user may forget which sequence of keys should be used to access the particular services. According to an embodiment of the invention, the user may transmit a key sequence or audible string such as "help call conferencing" over the overlay channel. Instructions as to how the service may be accessed may then be conveyed over the overlay channel to help the user access the requested feature. This may be done without interrupting the main conversation that is ongoing since the instructions are able to be conveyed via the overlay channel.

Figure 12:
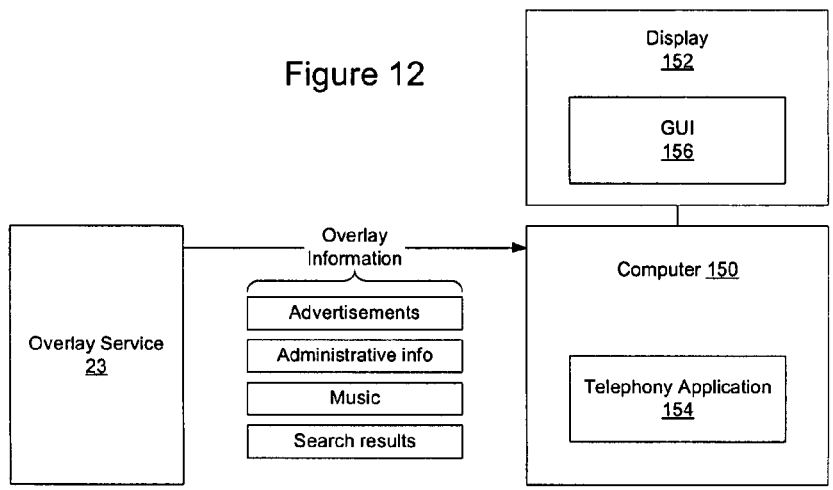
FIG. 12 is a functional block diagram of an overlay service interfacing with a telephony customer computer.

Although an embodiment of the invention has been described primarily in connection with overlaying information onto an extant audio stream, some of the information may also be amenable to being transmitted directly to telephony subscribers that are participating on the telephone call. For example, FIG. 12 shows an embodiment where a telephony customer has a computer 150 with a display 152. The computer may be a desk-top computer, lap-top computer, personal digital assistant (PDA), cell phone, blackberry, or other type of computing device capable of running a telephony application 154. Telephony applications 154 are common, and generally allow a user to make and participate in telephone calls through interaction with a GUI 156 that is shown on the display 152. According to an embodiment of the invention, advertisements, music, administrative information, and other types of information that is collected by the overlay service 23 may be passed directly to the telephony application, so that the overlay information may be included in the GUI being presented to the telephony customer on the display 152. In this manner, for example, targeted video advertisements may be presented to the user as the user makes telephone calls, such that the advertisements which appear to the user are related to the content of the telephone call and appear as part of the display associated with the telephony application that is being used to make the telephone call.

Similarly, by presenting the overlay information to the telephony application, the administrative information passed by the overlay service 23 may be incorporated into the information being shown on the display such that, for example, the name of the person speaking may be indicated on the telephony application GUI 156. Other examples of how the overlay information may be integrated into the information being generated for presentation on the display may be conceived as well, and the invention is not limited to these several examples.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

It will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of overlaying whispered audio on a telephone call, the method comprising the steps of:
   obtaining a main audio stream;
   formatting the main audio stream to create a frequency gap in the main audio stream, the frequency gap being created by reducing the amplitude of the main audio stream in a limited portion of a frequency spectrum;
   obtaining an overlay audio stream;
   formatting the overlay audio stream to create a whispered overlay audio stream, the whispered overlay audio stream being compressed into the limited portion of the frequency spectrum to primarily fit within the frequency gap in the main audio stream; and
   combining the formatted main audio stream and the whispered overlay audio stream to create a combined audio stream; and
   transmitting the combined audio stream on the telephone call.

2. The method of claim 1, wherein the main audio stream is a voice conversation between participants to the telephone call; and wherein the whispered overlay audio stream is administrative information associated with the telephone call.

3. The method of claim 2, wherein the telephone call is a conference call between at least three participants, and wherein the administrative information includes at least one of a name of a person joining the telephone call and a name of a person speaking on the telephone call.

4. The method of claim 1, wherein the telephone call is a conference call, the method further comprising the step of allowing a chairperson hosting the conference call to control the whispered overlay audio stream.

5. The method of claim 4, wherein the step of allowing the chairperson to control the whispered overlay audio stream comprises allowing the chairperson to set a volume of the whispered overlay audio stream relative to the main audio stream.

6. The method of claim 4, wherein the step of allowing the chairperson to control the whispered overlay audio stream comprises allowing the chairperson to specify whether the whispered overlay audio stream may be used by other participants to the conference call to communicate information between each other.

7. The method of claim 1, wherein the whispered overlay audio stream comprises advertising.

8. The method of claim 1, wherein the whispered overlay audio stream comprises background music.

9. The method of claim 1, wherein the whispered overlay audio stream comprises search results.

10. The method of claim 1, wherein the step of formatting the overlay audio stream to primarily fit within the frequency gap in the main audio stream comprises formatting the overlay audio stream to simulate a whisper.

11. The method of claim 1, wherein the step of formatting the main audio stream to create a frequency gap in the main audio stream comprises performing frequency analysis and pitch shifting to increase or decrease the frequencies of particular syllables or phonemes to reduce the amplitude of the signals present in a band of audible frequencies designated to carry the frequency gap.

12. The method of claim 11, wherein the step of formatting the main audio signal stream further comprises performing multi-band compression and equalization to equalize signals outside of the frequency gap.

13. The method of claim 12, wherein the step of formatting the main audio signal stream further comprises performing global amplitude compression to reduce the differences between loud and quite sounds while the overlay audio signal stream is present.

14. The method of claim 13, further comprising a step of adjusting a volume of the combined audio stream such that the combined audio stream has approximately the same volume as an original volume of the obtained main audio stream so that an output volume on the telephone call does not increase or decrease dramatically when the overlay audio signal is present.

15. The method of claim 1, wherein a volume of the main audio stream is greater than a volume of the whispered overlay audio stream.

* * * * *